Sept. 16, 1958 H. S. LENHART 2,852,315
MATERIAL FEEDER
Filed Oct. 5, 1956 2 Sheets-Sheet 1

INVENTOR.
HERBERT S. LENHART
BY
ATTORNEYS

Sept. 16, 1958     H. S. LENHART     2,852,315
MATERIAL FEEDER

Filed Oct. 5, 1956                               2 Sheets-Sheet 2

INVENTOR.
HERBERT S. LENHART
BY
ATTORNEYS

United States Patent Office 2,852,315
Patented Sept. 16, 1958

2,852,315

MATERIAL FEEDER

Herbert S. Lenhart, Allentown, Pa., assignor to Fuller Company

Application October 5, 1956, Serial No. 614,207

8 Claims. (Cl. 302—49)

This invention is concerned with the conveying of solid materials, and is more particularly related to a blow-through feeder for the feeding of loose discrete particles into fluid streams for transport to a desired location.

In the feeding of some materials in rotary blow-through feeders, for example flour, parts of the material tend to lodge in surface irregularities of the rotor pockets, forming foundations for arching or bridging of material within the pocket. In these cases, a recirculating load of packed or bridged material may be carried beyond the discharge segment, and be carried around in the pockets indefinitely or until jarred or agitated loose. In severe cases, it has been necessary to resort to chromium plating or other high cost surface finishes or treatments of the rotor surfaces to minimize the problem.

Another particularly difficult type of material to feed is that which leaves a residue of material which is either adhesive in nature or which tends to increase frictional resistance between moving surfaces. Thus, wood chips, which exude resinous compounds or saps when abraded, deposit resins on any closely fitting feeder surfaces across which they are rubbed. Continued deposition of the resins builds a hard coating on the surfaces involved, eventually eliminating the designed surface-to-surface clearances and jamming the machine. In such instances frequent disassembly and removal of the coating have been necessary to avoid damage to the machines.

Materials such as finished Portland cement, which are extremely abrasive on the metals used in rotary blow-through feeders, will ruin clearances and seals by erosion, and may eventually destroy the usefulness of known rotary blow-through feeders.

Furthermore, the materials generally conveyed in rotary blow-through feeders will exhibit various characteristic tendencies to compress and slug into the conveying line. As a pocket filled with material indexes with the air supply and conveying lines, the impact of the conveying air will push the loose material initially ahead of the air, tending to compress the material into a dense cylinder or slug in the transport line. Such a dense slug will exhibit extremely high frictional properties, both between the particles themselves and between the outer particles and the pipe walls. The slug subsequently is progressively permeated and disintegrated into a relatively dense conveying stream, but the pressures required to convey the slug, until it is disintegrated, are excessive in comparison to the pressures required for maintaining dense phase streams.

The term "dense phase" is used here to mean a solids-entraining fluid stream in which a high solid-to-fluid ratio exists, in contrast to "lean phase" systems in which a low solid-to-fluid ratio exists.

The present invention contemplates a rotary blow-through feeder which is more efficient in the feeding of difficultly-handled materials, such as those referred to above, and which provides for introducing the material to be fed into a stream in a manner which is relatively progressive, rather than substantially instantaneous, in that a proportioned amount of air enters the rotor discharge area adjacent to the periphery of the pocket, and initially parallel to the axis of the rotor, but outwardly beyond the area circumscribed by the rotation of the feeder rotor.

More specifically the rotor of the present feeder comprises an axially-tapered hub with blades which complement the angles of the outer surface of the hub to describe a generally cylindrical overall form for the rotor assembly. This causes the general configuration of the pockets to progressively decrease in their radial dimensions in the direction of the air flow, so that material is displaced in a generally radial direction into the adjacent air stream, and is completely removed from the rotor pockets before it reaches the downstream end of the rotor, and enters a radially-outlying conveying channel or trough of the feeder casing. The conveyor channel or trough increases in cross-sectional area, in the direction of air flow at a rate approximately directly proportional to the rate of decrease in radial cross-sectional area of the rotor pockets caused by the taper of the rotor. This provides a substantially constant cross-sectional area between the confines of the rotor pocket and the walls defining the conveying channel from one end of the feeder to the other, and, therefore, a correspondingly constant velocity for the air stream.

The invention will be further described in connection with the accompanying drawings which illustrate a preferred form of the rotary feeder.

Figure 1:
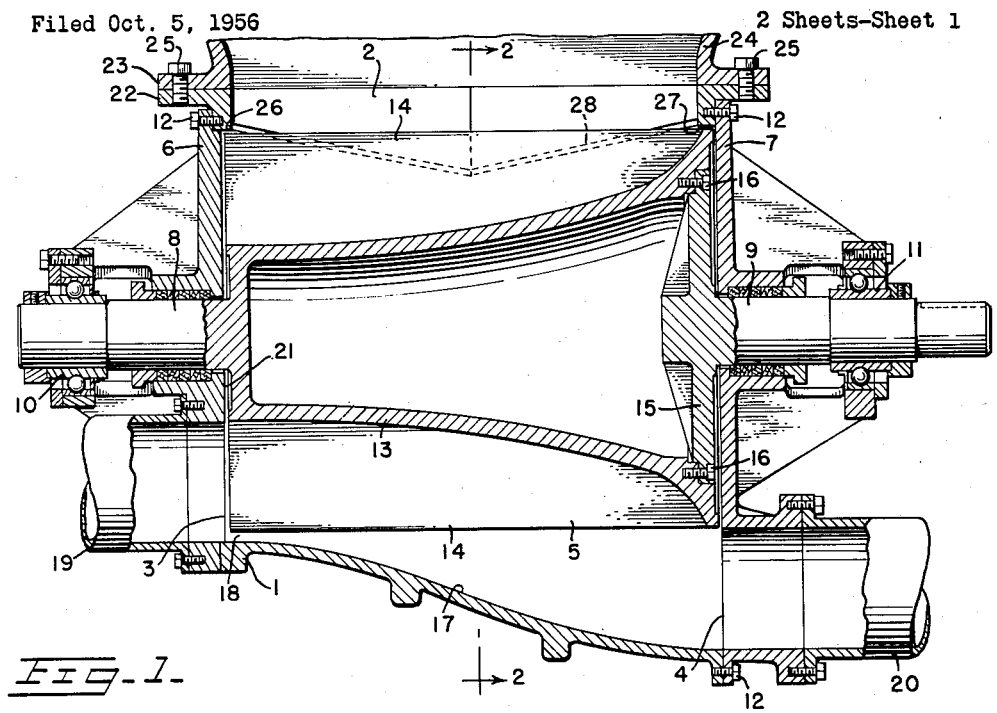
Fig. 1 is a section view of the present rotary feeder taken on the longitudinal centerline of the rotor thereof.
Figure 2:
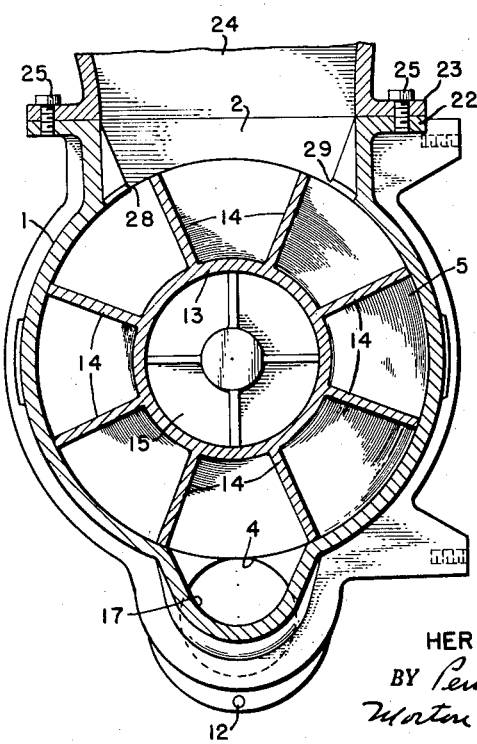
Fig. 2 is a cross-section taken on the line II—II of Fig. 1 but with the rotor blades in a slightly different position.
Figure 3:
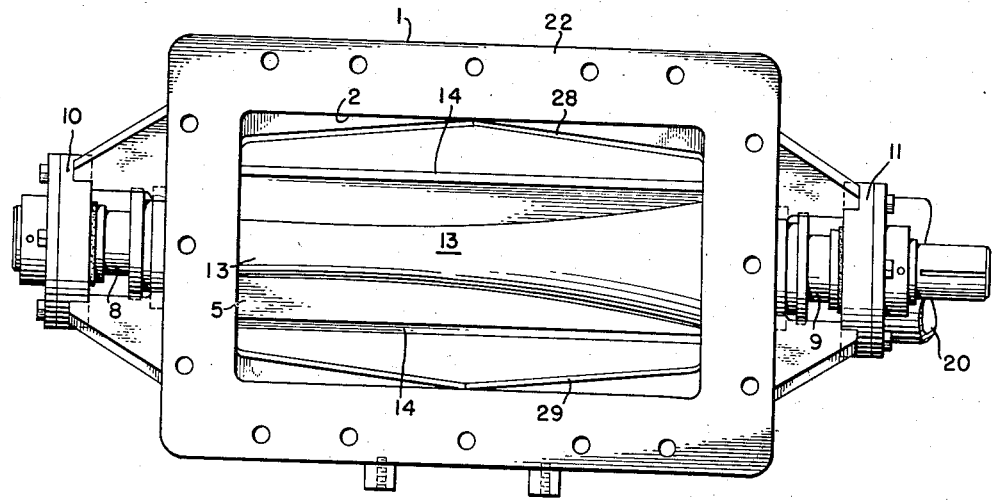
Fig. 3 is a plan view of the rotary feeder, showing the shear edges at the inlet to the rotor chamber.

Referring to the drawings, the rotary feeder comprises a generally cylindrical feeder casing 1 having a material inlet 2, an air inlet 3 and a discharge outlet 4. The casing 1 has a cylindrical rotor chamber for a feeder rotor 5 concentrically positioned therein. The ends of the rotor chamber are closed by end plates 6 and 7, through which the rotor shafts 8 and 9 extend for journaling in bearings 10 and 11. The end plates are secured to the feeder casing 1 by bolts 12.

The cylindrical rotor 5 comprises a hub 13 axially increasing in diameter from the inlet side of the casing to the outlet side thereof in a wide sweeping arc, so that at its conveying outlet end, the hub of the rotor completely fills the area between the blades and, being circular in cross-section, forms a disc or shroud substantially covering the internal surface of end plate 7 throughout the full diameter of the interior bore of the casing, so that there is no contact of the material with end plate 7 while the material is within the pockets.

The rotor hub is provided with a plurality of accurately-spaced, radially-extending blades 14, forming pockets around the periphery of the hub which progressively decrease in radial cross-sectional area from a maximum at the inlet end of the casing to substantially nothing at the outlet end thereof.

The rotor shafts 8 and 9 extend from the ends of the hub 13. As shown, the shaft 8 is formed integrally with the small end of the hub. The shaft 9 may be formed integrally with the large end of the hub, but preferably is provided with an integral reinforced plate 15 which has its periphery portion bolted to the end of the rotor hub by bolts 16.

At its bottom portion, the casing 1 is provided with a longitudinal, outwardly-extending material receiving and conveying channel or trough 17 which progressively increases in cross-sectional area from the inlet end of the casing to the outlet end thereof where it merges into the outlet 4. The extent to which the trough 17 progressively increases in cross-sectional area is approximately the same as the extent of progressive decrease in cross-sectional area of the respective pockets of the rotor towards the discharge outlet. Thus, when one of the rotor pockets is radially aligned with the trough 17 a conveying passage of approximately uniform cross-section is provided from the inlet 3 to the outlet 4 and the discharging air traveling therethrough will be maintained at a substantially constant velocity.

While the inner side of the trough 17 at its outlet end coincides with the innermost point of the outlet 4 and with the line generated by rotation of the outer edges of the rotor blades, the inner side of the trough at the inlet end is spaced radially-outwardly of the line generated by the rotation of the outer edges of the rotor blades a slight distance, 18, providing a free passage for air from the inlet 3 to the conveying trough 17. This has the advantage that should the material tend to cake in the pockets and not fall freely into the trough 17 when a pocket is indexed with the air inlet, the air passing through the space 18 will have its velocity increased to an extent where it will erode the edge of the caked material and thereby cause its removal from the pocket. The passage 18 also provides for a constant flow of air through the conveying trough 17 and the discharge 4 for any material falling into the trough, and further provides for a continuous flow of air through the discharge line which minimizes pulsations in the discharge line pressure and possible plugging of the line.

A pipe 19 is connected to the inlet 3 for the introduction of air under pressure into the rotor pockets and into the conveying trough 17, and a pipe 20 is connected to the outlet 4 for the discharge and conveying away of material blown from the rotor pockets and the conveying trough 17.

In connection with the feeding of certain materials, for example, wood chips, it is desirable to provide a clearance 21 between the small end of the rotor hub and its adjacent end plate 6 which is slightly in excess of that necessary to provide for free rotation of the rotor, in order to provide for a predetermined slight flow of air from the inlet 3 between the end of the rotor and the end plate 6 to prevent particles of the chips from entering therebetween, with resulting smearing of resins of the chips onto the end plate with the disadvantages previously referred to.

Since the large end of the hub of the rotor forms a disc or shroud which substantially covers the internal surface of end plate 7, the material in the respective pockets, when subjected to the pressure of the discharging air from inlet 3, cannot be forced against the end plate with resulting increase of friction and abrading and smearing of the material against that end plate.

The material inlet 2 is provided with a flange 22 by which the feeder is secured to a flange 23 of a bin 24 by bolts 25.

The bin 24 may be of the conventional type, or it may be a bin such as is disclosed in the patent to Weller No. 2,681,748 having air-activated gravity conveyors in its bottom terminating adjacent the material inlet 2, so that the material will be introduced into the rotor pockets in an aerated state.

The length of the material inlet 2, in the direction of the axis of the rotor, is slightly less than the corresponding length of the rotor chamber to provide overhanging shoulders 26 and 27 so that material entering the pockets through the inlet is not fed directly against the ends of the pockets. Therefore, if material such as wood chips is being handled, there will be less abrasion of the chips against the ends of the pockets during the filling of the pockets, and, consequently, less exuding of resin from them.

A shearing edge 28 is provided at the inner longitudinal edge of material inlet 2 past which the pockets move after having been filled. This edge extends in a non-parallel direction with respect to the rotor axis so that substantially less than its full length meets the peripheral edge of a blade at any given time. It is shown as a V edge, which produces a sliding shear with the blade periphery, and a consequent tendency to move the material away from the ends of the pockets towards the middle thereof, thus further tending to reduce abrasive action between the end plates and material in the pockets. However, other configurations of the shearing edge may be employed to produce a similar result.

The longitudinal edge of the material inlet 2 at the opposite side may be provided with a similar shearing edge 29. While such a shearing edge will perform no shearing function as the rotor rotates in a counterclockwise direction, it will provide the aforesaid shearing action if the rotor is driven in a clockwise direction. Thus, the feeder may be used with either right or left-handed drives.

In operation, the rotor is driven by a suitable motor (not shown) and revolves past the material inlet 2 where the pockets serially receive material from the bin.

The rotation of the rotor serially brings the rotor pockets to their discharge position where the ends adjacent the end plate 6 are in axial alignment with the air inlet 3. As the pockets are brought into alignment with the air inlet, the material in them is struck by the blast of air from the air pipe 19 and is swept thereby axially along and outwardly of the pockets to be received in the conveying trough 17. The air forces the material along the trough 17 and discharges it from the feeder through the outlet 4 into the conveyor line 20 by which it is transported to the desired place.

As the air blast from the pipe 19 initially strikes the material in the pockets, the less compacted material is immediately entrained and swept into the conveying trough by the air stream. The motion of this material as it is entrained serves to dislodge material adjacent to it, facilitating immediate entrainment of any more compacted material. Should the material cake in the pockets, the small amount of high velocity air flowing through the space 18 will erode away the edge of the caked material until all of it is entrained and swept into the conveying trough 17 and from it through the outlet 4 into the transport line 20.

If the physical properties of the material are such that it tends to compress and form a piston ahead of the major air stream, it is pushed axially along the rotor pockets by the air, but is diverted progressively radially by the widening end of hub 13 until the material is forced beyond the supporting surfaces of the hub and blades 14, and is broken across the peripheral edge of the wide end of the hub into small masses which themselves are instantaneously broken up or disintegrated and entrained by the air stream blowing through the trough 17 past the hub edge. This procedure will exist to some extent with all materials handled by the feeder, but it is particularly useful with materials which tend to compress in the rotor pockets or to slug in the transport line.

Because of the provision of by-pass 18, communication between air inlet 3 and material outlet 4 will not be totally blocked as the result of the moving of a pocket filled with material into alignment with the inlet. Therefore, the material will be fed into the air stream progressively and the air/material ratio will be relatively stable as the material enters the transport pipe 20.

As the trailing blade 14 of each pocket passes the shearing edge 28, any material which protrudes beyond the pocket periphery or, as in the case with wood chips, is draped over the blade edge, is sheared between the blade edge and the shearing edge 28, being dropped into the succeeding pocket or else lifted back into the material inlet for subsequent loading.

In transit from the material inlet to the discharge area, where the pockets are in axial alignment with the inlet air opening 3, the material is kept out of contact with end plate 7 by the shrouding effect of the wide end of hub 13. It is this downstream end which is usually most troublesome with respect to material getting between the rotor and the end plate of the casing.

The overhanging shoulders 26 and 27 of the inlet 2 which cause the material to be loaded away from end plate 6, the shearing edge 28, which tends to move the material toward the longitudinal center of the pocket, and the slight air leakage into the space between the small end of the rotor and the end plate 6 at the air inlet end, all tend to prevent, or at least minimize, the rubbing contact of the material with end plate 6 and the deposition of resins or other material thereon.

Since the prevention or minimization of grinding of material between the rotor and the end plates eliminates the excessive abrasion and lamination problems heretofore sometimes encountered in machines of this class, materials such as highly abrasive finished cement and resinous wood chips may be conveyed without the extreme maintenance and replacement costs previously typical in such installations.

The constant angular incidence of the major air stream against the inner extremities or bottoms of the pockets serves to clean the pockets thoroughly in preparation for further loading. This is particularly advantageous in installations wherein the machine is required to handle two or more materials, interchangeably. Being self-cleaning, the machine can be run unloaded momentarily to clear residual dust of one material, and then be used to convey another material without disassembly for cleaning, and without detrimental contamination between the two materials.

The constant angular incidence of the major air stream against the bottoms of the pockets is also advantageous in the handling of such materials as flour, where any material left in corners of the pockets is subject to infestation.

Various changes may be made in the details of construction of the feeder shown in the drawings without sacrificing any of the advantages thereof or departing from the scope of the invention as set forth in the appended claims.

I claim:

1. Material feeding apparatus comprising a casing having a rotor chamber, a material inlet, a discharge-fluid inlet and a material-fluid outlet, said fluid inlet and said material-fluid outlet being arcuately spaced from said material inlet and in opposite axial ends of said casing with respect to each other, a rotor mounted in said rotor chamber for rotation therein, spaced blades extending in a generally radial direction from the rotor and forming pockets about the rotor hub, said pockets being open at least at the fluid-inlet end of the casing, the fluid inlet being so positioned that, as the rotor rotates, the ends of the pockets at one end of the rotor are serially brought into alignment therewith, the material-fluid outlet being positioned, at least in part, outwardly of the line generated by rotation of the outer edges of the blades of the rotor, the casing having a channel or trough, outwardly of said line generated by rotation of the blades, and terminating at one end in alignment with the material-fluid outlet, for receiving material discharged from the rotor pockets as they serially are brought into alignment with the fluid inlet, said channel being in communication throughout its length with the pockets as the ends of the pockets are brought, respectively, into alignment with the fluid inlet and the material-fluid outlet, the rotor hub tapering outwardly from adjacent the end of the rotor at the fluid inlet end of the casing towards the end of the rotor at the material-fluid outlet end of the casing, whereby fluid introduced successively into the pockets from the fluid inlet, as the pockets come into alignment therewith, will force material in the pockets lengthwise thereof towards the material-fluid outlet and radially into said channel or trough.

2. A material feeding apparatus as defined in claim 1 in which the rotor hub tapers progressively outwardly along a curved line extending from adjacent the end of the rotor at the inlet end of the casing to the end of the rotor at the outlet end of the casing, whereby fluid introduced successively into the pockets from said fluid inlet, as said pockets come into alignment with the fluid inlet, will force material axially of said pockets towards the material-fluid outlet and radially of said pockets into said channel or trough.

3. A material feeding device as defined in claim 1 in which the outer edges of the rotor blades are substantially parallel to the rotor axis, whereby the radial depth of the rotor pockets decreases in the longitudinal direction of the rotor towards the outlet end of the casing.

4. Conveying apparatus according to claim 3 in which said channel or trough increases in cross-sectional area in the direction of the material-fluid outlet substantially in proportion to the decrease in cross-sectional area of said pockets in said direction resulting from the taper of said rotor hub, so that said pockets and said channel form a duct of substantially uniform cross-sectional area throughout the length of said duct.

5. A material feeding device as defined in claim 1 in which the fluid inlet extends radially-outwardly an appreciable distance beyond the line generated by the rotation of the outer edges of the blades to provide a by-pass for a portion of fluid forced through the fluid inlet.

6. A material feeding device as defined in claim 1 in which the rotor hub at the inlet end of the casing is spaced from the casing wall a distance sufficient to permit an appreciable amount of fluid from the fluid inlet to pass through the resultant space and along the adjacent inner wall of the casing opposite the ends of the pockets.

7. A material feeding device as defined in claim 1 in which an edge portion defining the material inlet, at the side thereof which a blade passes after the pocket at the forward side thereof in the direction of rotation of the rotor has been filled, is a shear edge and extends at an angle to the axis of the rotor.

8. A material feeding device as defined in claim 7 in which the shear edge is of general V-shape, with the legs thereof converging in the direction of rotation of the rotor.

References Cited in the file of this patent

UNITED STATES PATENTS

| | | |
|---|---|---|
| 1,231,778 | Nall | July 3, 1917 |
| 1,837,957 | Ernst | Dec. 22, 1931 |
| 2,664,724 | Kronstad | July 7, 1953 |
| 2,681,748 | Weller | June 22, 1954 |
| 2,712,475 | Lukes | July 5, 1955 |
| 2,757,049 | Temple | July 31, 1956 |
| 2,795,464 | Richards | June 11, 1957 |

FOREIGN PATENTS

| | | |
|---|---|---|
| 667,263 | Germany | Feb. 6, 1937 |
| 659,030 | Great Britain | Oct. 17, 1951 |
| 1,008,859 | France | Feb. 27, 1952 |